United States Patent [19]
Kidd et al.

[11] 4,258,536
[45] Mar. 31, 1981

[54] POWER ROTARY CUTTING BLADE WITH RETRACTABLE CUTTING KNIVES

[75] Inventors: Earl H. Kidd; Herman H. Martin, Jr.; Raymond R. Reid, all of Galesburg, Ill.

[73] Assignee: Outboard Marine Corporation, Waukegan, Ill.

[21] Appl. No.: 10,267

[22] Filed: Feb. 7, 1979

[51] Int. Cl.³ .................. A01D 35/262; A01D 55/18
[52] U.S. Cl. ..................................... 56/17.5; 56/295
[58] Field of Search ............................. 56/17.5, 295

[56] References Cited

U.S. PATENT DOCUMENTS

| | | | |
|---|---|---|---|
| 2,529,870 | 11/1950 | Golasky | 56/17.2 |
| 2,939,264 | 6/1960 | Kontis | 56/295 |
| 2,953,888 | 9/1960 | Phillips et al. | 56/295 |
| 3,133,398 | 5/1964 | Tatum | 56/295 |
| 3,184,907 | 5/1965 | Harloff | 56/295 |
| 3,320,733 | 5/1967 | Kirk | 56/295 |
| 3,563,015 | 2/1971 | Renfroe | 56/295 |
| 3,621,642 | 11/1971 | Leake, Jr. | 56/295 |
| 3,690,051 | 9/1972 | Wood | 56/295 |
| 3,715,874 | 2/1973 | Goserud | 56/295 |
| 3,738,092 | 6/1973 | Spear | 56/295 |
| 3,762,138 | 10/1973 | Michael | 56/295 |
| 3,888,072 | 6/1975 | Templeton | 56/295 |
| 3,949,541 | 4/1976 | Henry | 56/295 |
| 4,114,354 | 9/1978 | Morris | 56/295 |

FOREIGN PATENT DOCUMENTS

| | | | |
|---|---|---|---|
| 246599 | 11/1960 | Australia | 56/295 |
| 1582345 | 5/1970 | Fed. Rep. of Germany | 56/295 |
| 1582352 | 5/1970 | Fed. Rep. of Germany | 56/295 |
| 2058347 | 6/1972 | Fed. Rep. of Germany | 56/295 |
| 2327356 | 1/1975 | Fed. Rep. of Germany | 56/295 |
| 1519808 | 2/1968 | France | 56/295 |
| 246184 | 11/1969 | U.S.S.R. | 56/295 |

Primary Examiner—Paul J. Hirsch
Attorney, Agent, or Firm—Michael, Best & Friedrich

[57] ABSTRACT

A rotary lawn mower comprises a chassis, a prime mover mounted on the chassis, and a rotating member operatively connected with the prime mover for rotation within the chassis and having a peripheral edge. A cutting blade is movably secured to the rotating member for movement between a retracted position in which the cutting blade is positioned inwardly of the peripheral edge and an extended position in which the cutting blade extends outwardly beyond the peripheral edge. A control mechanism is connected to the chassis and movable axially of the axis of rotation of the rotating member for moving the cutting blade between the retracted and extended positions.

32 Claims, 15 Drawing Figures

U.S. Patent  Mar. 31, 1981  Sheet 1 of 4  4,258,536
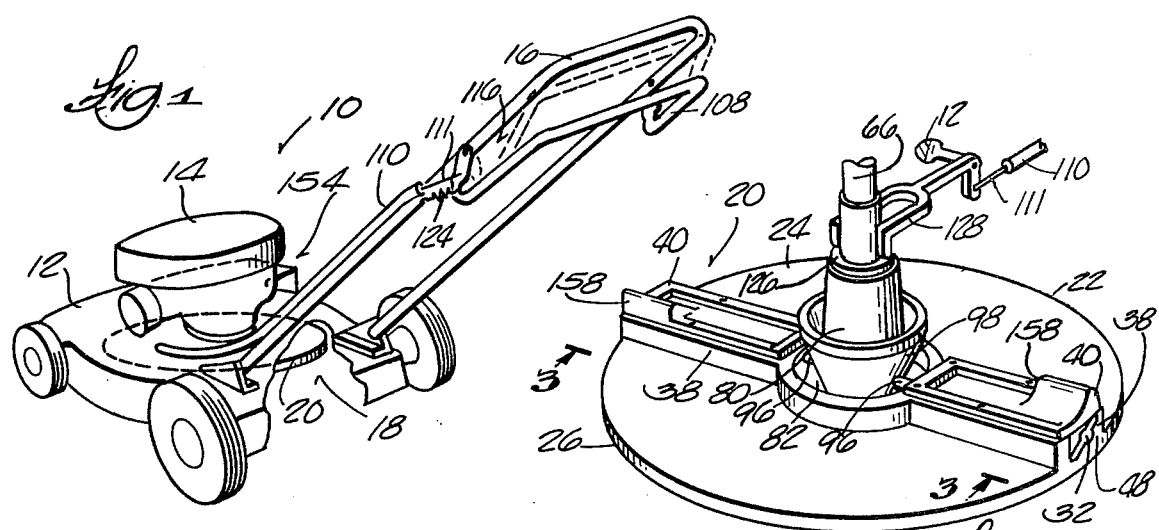
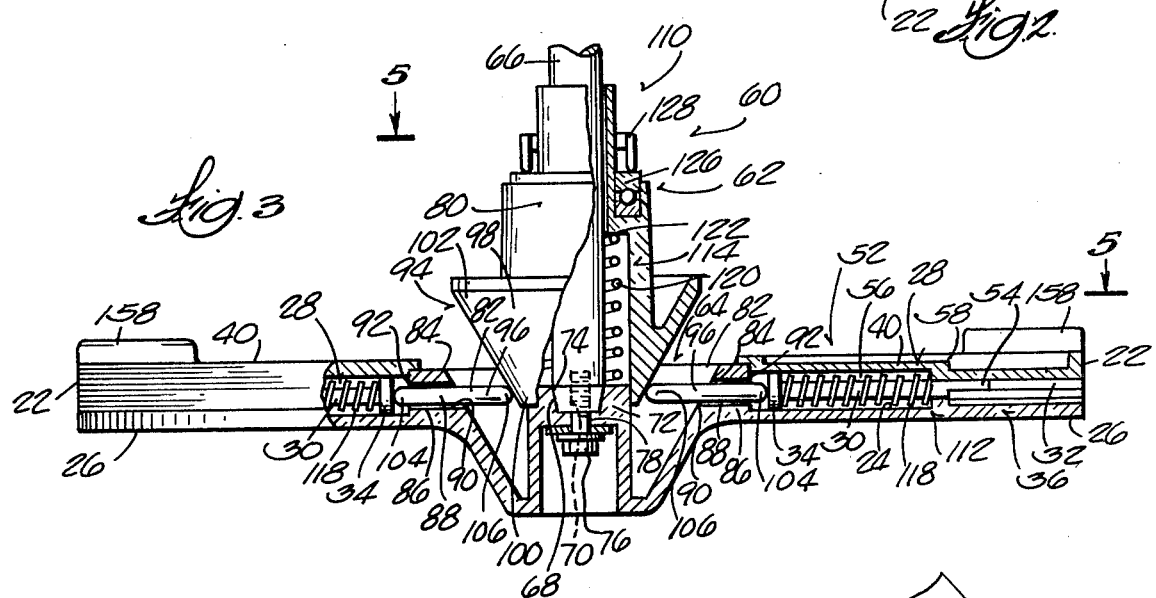
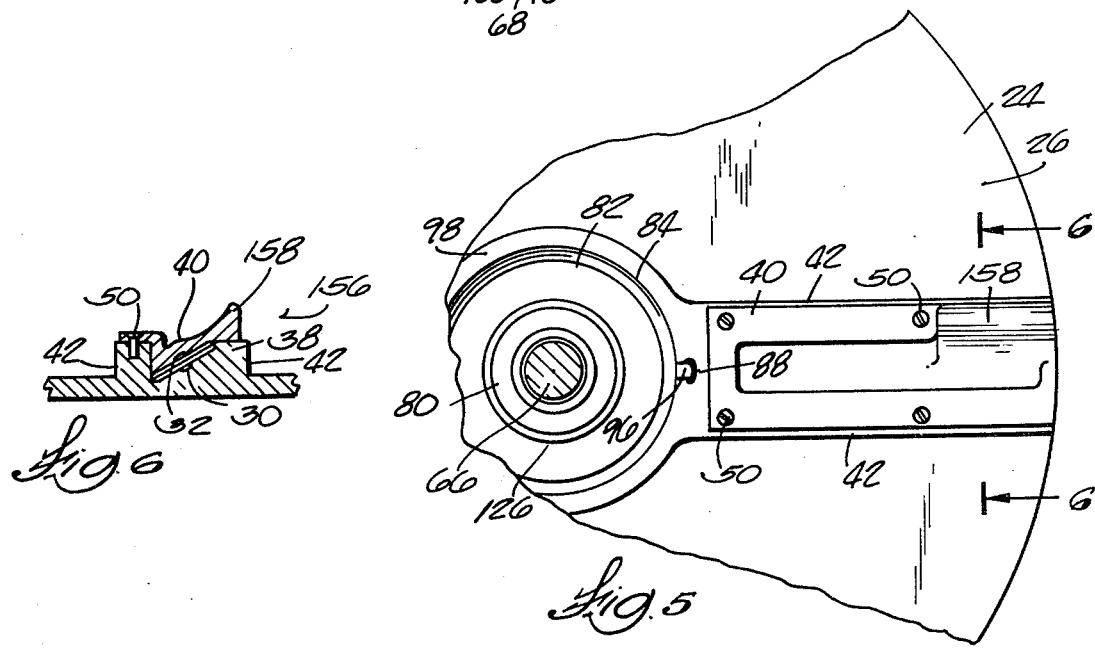

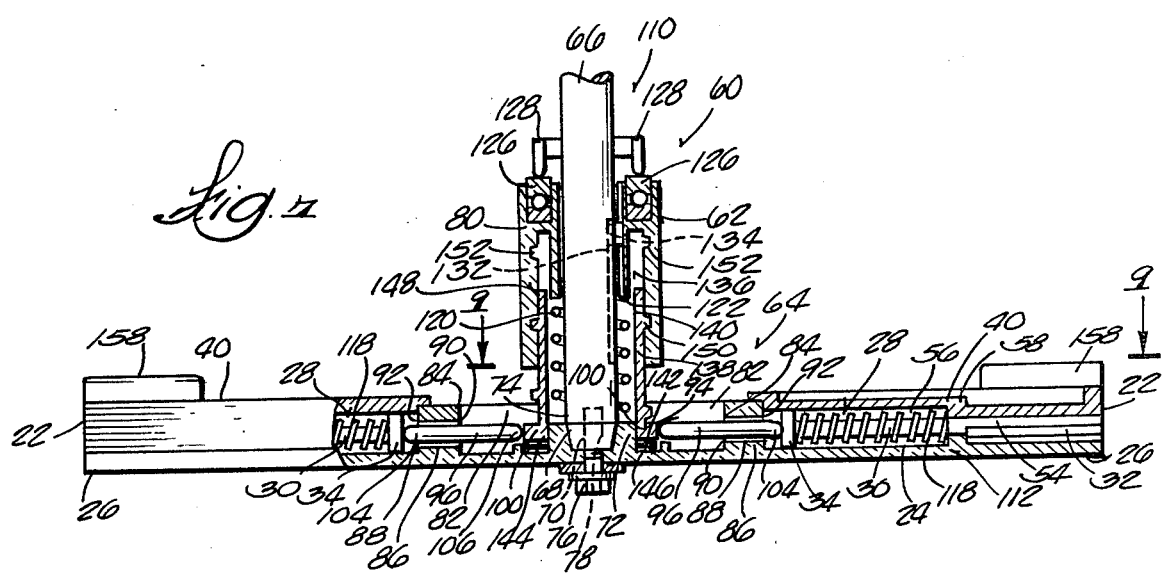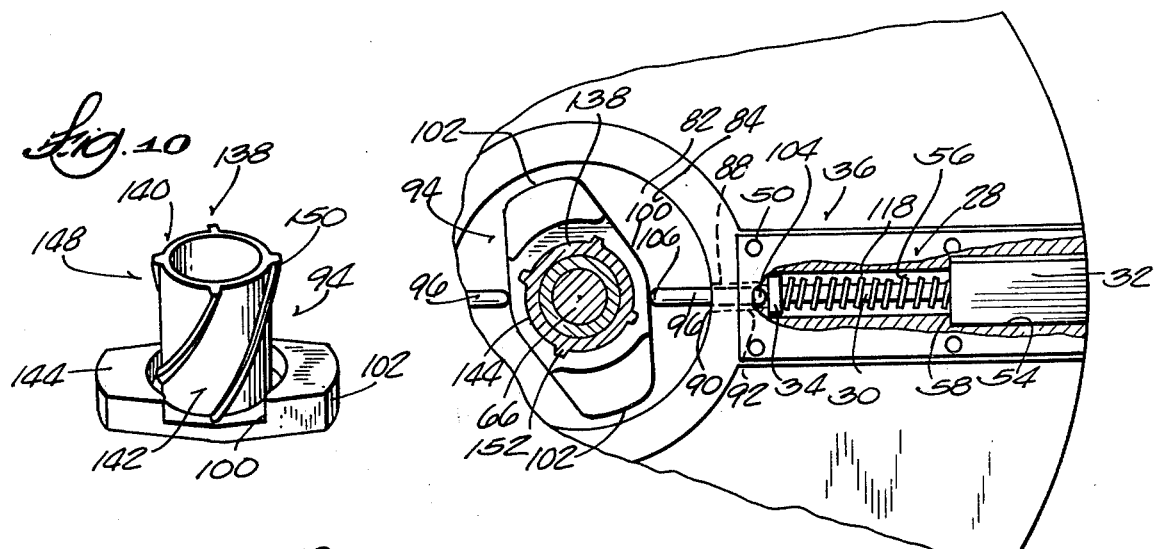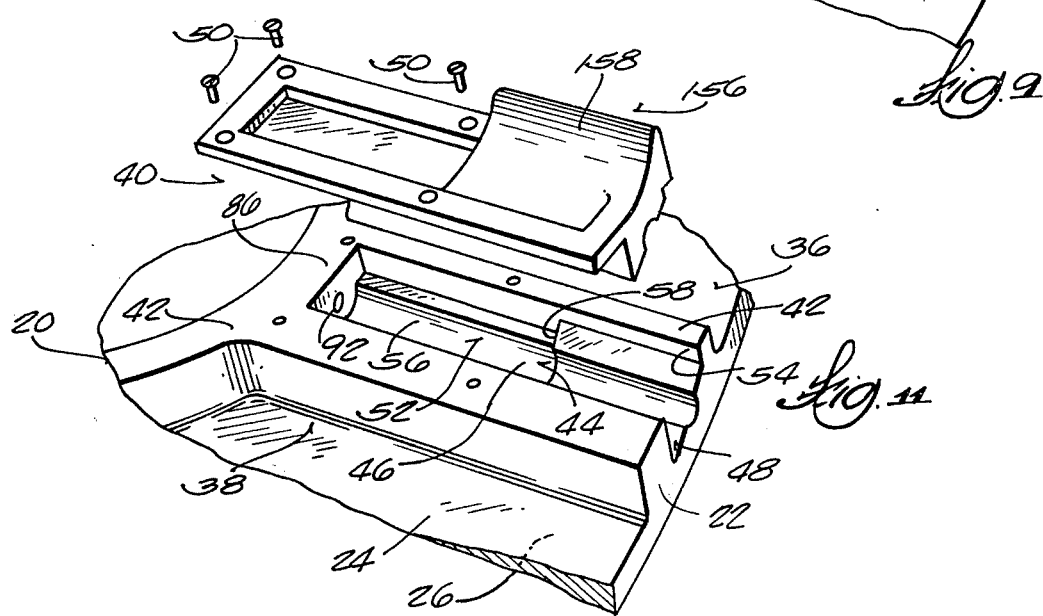

POWER ROTARY CUTTING BLADE WITH RETRACTABLE CUTTING KNIVES

BACKGROUND OF THE INVENTION

I. Field of the Invention

The invention relates generally to rotary lawn mowers, and more particularly, to rotary lawn mowers having blade mountings which permit selective displacement of the blades between a retracted and an extended position.

II. Description of the Prior Art

Rotary lawn mowers which include blade housings in which the blades are movable between a retracted and an extended position are known and disclosed in the following U.S. Patents:

Kontis U.S. Pat. No. 2,939,264 June 7, 1960
Tatum U.S. Pat. No. 3,133,398 May 9, 1964
Harloff U.S. Pat. No. 3,184,907 May 25, 1965
Kirk U.S. Pat. No. 3,320,732 May 23, 1967
Wood U.S. Pat. No. 3,690,051 Sept. 12, 1972
Goserud U.S. Pat. No. 3,715,874 Feb. 13, 1973
Spear U.S. Pat. No. 3,715,874 June 12, 1973
Morris U.S. Pat. No. 4,114,354 Sept. 19, 1978

Attention is also directed to the following foreign patents:

German Pat. Nos. 1,582,345; 1,582,352; 2,058,347; and 2,327,356
Russian Pat. No. 246,184
French Pat. No. 1,519,808
Australian Pat. No. 246,599

It is desirable for the operator of a lawn mower to be able to selectively control the disposition of the movable cutting blades so that the cutting blades are in their extended position when the operator is in guiding control of the lawn mower. Much of the above cited prior art (in particular, Kontis, Kirk, Wood, Goserud, Spear, Morris and the Russian Patent) coordinate the disposition of the movable cutting blades with the engine speed, such that the cutting blades move into the extended position in response to a predetermined amount of centrifugal force. None of the above cited prior art discloses a blade control mechanism for selectively controlling the disposition of the cutting blades regardless of the engine speed or amount of centrifugal force present, and which control mechanism returns the cutting blades to their retracted position whenever the operator is not in guiding control of the lawn mower. Furthermore, none discloses a means for swirling the air within the chassis to provide for effective airborne discharge of grass clippings, particularly when the cutting blades are in their retracted position.

SUMMARY OF THE INVENTION

The invention provides a rotary lawn mower comprising a chassis, a prime mover mounted on the chassis, and a rotating member operatively connected with the prime mover for rotation within the chassis and having a peripheral edge. A cutting blade is carried by the rotating member and movable between a retracted position in which the cutting blade is positioned inwardly of the peripheral edge and an extended position in which the cutting blade extends outwardly beyond the peripheral edge. Control means is connected to the chassis and movable axially of the axis of rotation of the rotating member for moving the cutting blade between the retracted and extended positions.

In accordance with one embodiment of the invention, a handle is attached to the chassis, and a control lever is pivotally mounted on the chassis for movement between an inoperative position spaced from the handle and an operative position adjacent to the handle. Second linkage means operatively connects the control means with the control lever, such that, when the control lever is in the inoperative position, the control means is axially disposed so that the cutting blade is in the retracted position, and when the control lever is in the operative position, the control means is axially disposed so that the cutting blade is in the extended position. Selective operator control of the disposition of the cutting blade is thereby provided.

In accordance with one embodiment, the control means includes a sliding member selectively movable axially along the axis of rotation of the rotating member between a first axial position and a second axial position, and first linkage means connects the sliding member with the cutting blade for moving the cutting blade between the retracted and extended positions in response to movement of the sliding member between the first and second axial positions.

In accordance with one embodiment of the invention, first biasing means biases the cutting blade toward the retracted position when the sliding member is in the first axial position, second biasing means biases the sliding member toward the first axial position, and third biasing means biases the control lever in the inoperative position. By virtue of this cooperation of the biasing means, the cutting blade is in the extended position only when the operator is in guiding control of the lawn mower and is thereby able to maintain the control lever in the operative position. Release of the control lever, such as when the operator intentionally or accidentally relinquishes guiding control of the lawn mower, permits the quick return of the cutting blade to the retracted position by action of the biasing means.

In accordance with one embodiment, a drive shaft operatively connects the rotating member with the prime mover, and the sliding member includes a first cylindrical sleeve member operative for axial movement upon the drive shaft between the first and second axial positions. In this embodiment, the first linkage means includes pin means operatively connected with the cutting blade and movable between a normal position and a displaced position for moving the cutting blade between the retracted and extended positions, and cam means operatively connecting the first cylindrical sleeve member with the pin means for displacing the pin means in response to axial movement of the first cylindrical sleeve member. In particular, the cam means includes a cone-shaped member carried circumferentially about the first cylindrical sleeve member for common axial movement therewith. The outer perimeter surface of the cone-shaped member is progressively sloped between a first and second cam surface such that, when the first cylindrical sleeve member is moved from the first to the second axial position, the pin means follows the progressively sloped surface between the first and second cam surfaces and is thereby displaced from its normal to its displaced position, simultaneously moving the cutting blade from its retracted to its extended position.

In accordance with one embodiment, the first cylindrical sleeve member is operatively connected to the drive shaft for common rotation, while still being movable axially along the drive shaft. In this embodiment, the rotating member is integrally connected to the first cylindrical sleeve member for common rotation about the drive shaft and for common axial movement along the drive shaft, and the cam means includes a cone-shaped member mounted on the drive shaft for common rotation therewith. The cone-shaped member has an outer perimeter surface which is progressively sloped between the first and second cam surfaces. When the first cylindrical sleeve member, and thus the rotating member, is in the first axial position, the pin means contacts the first cam surface, and when the first cylindrical sleeve member, and thus the rotating member, is moved from the first to the second axial position, the pin means follows the progressively sloped surface from the first cam surface to the second cam surface, thereby moving the cutting blade from its retracted to its extended position.

In one embodiment, the first cylindrical sleeve member is also operatively connected to the drive shaft for common rotation, while still being movable axially along the drive shaft. In this embodiment, the first linkage means includes a second cylindrical sleeve member mounted for independent rotation intermediate the drive shaft and the first cylindrical sleeve member such that axial movement of the rotating first cylindrical sleeve member between its first and second axial positions rotates the second cylindrical sleeve member between predetermined first and second rotational positions. Means is provided which operatively connects the cutting blade with the second cylindrical sleeve member such that rotation of the second cylindrical sleeve member between its first and second axial positions moves the cutting blade between its retracted and extended positions.

In one embodiment, the means operatively connecting the cutting blade with the second cylindrical sleeve member includes the pin means heretofore described and a cam plate having an outer peripheral edge which is progressively sloped between the first and second cam surfaces and which is attached to the second cylindrical sleeve member. Rotation of the second cylindrical sleeve member between its first and second rotational position in response to axial movement of the first cylindrical sleeve member successively causes the pin means to follow the progressive slope between the first and second cam surfaces, thereby displacing the pin means and moving the cutting blade between the retracted and extended positions.

In accordance with one embodiment, the means operatively connecting the cutting blade with the second cylindrical sleeve member includes a plate member attached to the second cylindrical sleeve member for common rotation, and a link member operatively couples the plate member with the cutting blade for moving the cutting blade between its retracted and extended positions in response to rotation of the plate member.

In accordance with one embodiment of the invention, the rotary lawn mower includes a discharge outlet in the chassis for permitting the airborne discharge of grass cut by the cutting blade and vane means carried by the rotating member for creating air turbulence when the rotating member is being rotated to enhance the airborne discharge of grass through the discharge outlet.

In accordance with one embodiment, a plurality of cutting blades is provided, each cutting blade being movably attached to a housing provided on the rotating member for movement between the extended and retracted positions. Each housing has a removable cover member, and the vane means is an integral part of the cover member.

In accordance with one embodiment, the vane means includes an air deflection vane having a raised, generally concave surface portion facing the direction of rotation.

One of the principal features of the invention is the provision of a lawn mower having one or more blades movably secured to a rotating member for movement between a retracted position and an extended position, and control means connected to the chassis and selectively movable axially of the axis of rotation of the rotating member for moving the cutting blades between the retracted and extended positions.

Another of the principal features of the invention is the provision of a lawn mower including a handle having a control lever adapted for displacement by the operator, and linkage means coupled to the control lever which, in the absence of displacement of the control lever by the operator, maintains the cutting blades in the retracted position.

Another of the principal features of the invention is the provision of a lawn mower including an air deflection vane mounted on the rotating member, which vane creates air turbulence to assist the airborne discharge of cut grass, particularly when the blades are in the retracted position.

Other features and advantages of the embodiments of the invention will become known by reference to the following general description, claims, and drawings.

BRIEF DESCRIPTION OF THE DRAWINGS

FIG. 1 is a partially broken away perspective view of a lawn mower embodying various of the features of the invention;

FIG. 2 is a perspective view of a disc-shaped rotating member incorporated in the lawn mower shown in FIG. 1 and on which the cutting blades are mounted for movement between a retracted and an extended position;

FIG. 3 is a partially broken away side view of one embodiment of a blade control mechanism incorporated in the lawn mower shown in FIG. 1 and taken generally along line 3—3 in FIG. 2, in which the cutting blades are shown in their retracted position;

FIG. 5 is a fragmentary top view of the blade housing taken generally along line 5—5 in FIG. 3;

FIG. 6 is an end view of the blade housing taken generally along line 6—6 in FIG. 5;

FIG. 7 is a partially broken away side view of another embodiment of a blade control mechanism in which the cuttng blades are shown in their retracted position;

FIG. 9 is a fragmentary and partially broken away top view of the rotating member taken generally along line 9—9 in FIG. 7;

FIG. 10 is a perspective view of a rotatable cam incorporated in the blade control mechanism of FIG. 7;

FIG. 11 is an exploded perspective view of the blade housing incorporated in the lawn mower of FIG. 1.

Figure 4:
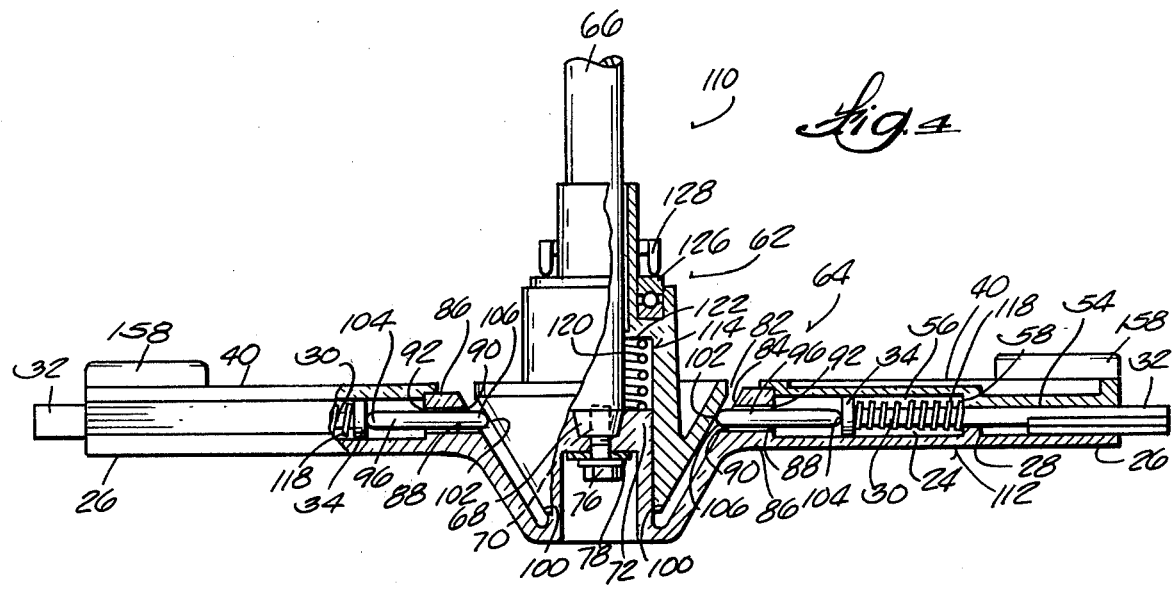
FIG. 4 is a partially broken away side view of the blade control mechanism shown in FIG. 3, except that the cutting blades are shown in their extended position.

Before explaining the embodiments of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology used herein for the purpose of description should not be regarded as limiting.

GENERAL DESCRIPTION

Shown in FIG. 1 is a lawn mower 10 which includes a chassis 12 and a prime mover 14, such as an electric motor or internal combustion engine, mounted on the chassis 12. The chassis 12 can be supported for travel over the ground in any manner, and can be guided for travel over the ground by a suitable handle 16 or other steering mechanism.

A rotating member 18 is operatively connected with the prime mover 14 and carried within the chassis 12. While the rotating member 18 may be variously constructed, in the illustrated embodiment (as best shown in FIG. 2), the rotating member 18 is a planar disc-shaped member 20 having a peripheral edge 22 and upper and lower planar surfaces 24 and 26.

One or more cutting blades 28 are carried by the disc-shaped member 20. As is best shown in FIG. 9 each cutting blade 28 includes a cylindrical stem 30 having a knife, or cutting, edge 32 formed on one end, and a collar 34 formed on the other end.

Figure 8:
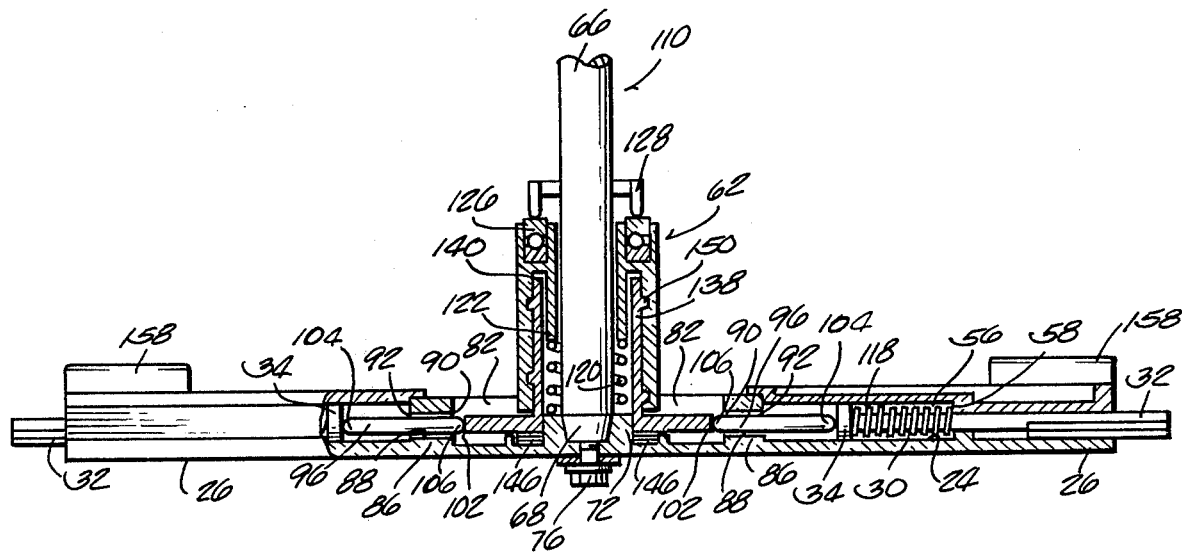
FIG. 8 is a partially broken away side view of the blade control mechanism shown in FIG. 7, except that the cutting blades are shown in their extended position.

Each cutting blade 28 is movably secured to the disc-shaped member 20 for movement between a retracted position, in which the knife edge 32 is positioned inwardly in the peripheral edge 22 (as shown in FIGS. 3, 7, and 9), and an extended position, in which the knife edge 32 extends outwardly beyond the peripheral edge 22 (as shown in FIGS. 4 and 8). When the cutting blade 28 is being rotatably carried by the disc-shaped member 20, the extended knife edge 32 cuts grass or other material in its path.

While there are various ways to movably secure the cutting blades 28 on the disc-shaped member 20, in the illustrated embodiment, the cutting blades 28 are carried in separate housings 36 which are generally spaced about the peripheral edge 22 of the disc-shaped member on the upper planar surface 24. As best shown in FIG. 11, each housing 36 includes a base portion 38 integral with the upper planar surface 24 and a cover portion 40 removably secured to the base portion 38. More particularly, the base portion 38 is defined by three upstanding lips 42 forming a rectangular channel 44 having an open top 46 peripherally bounded on three sides by the lips 42, and an open end 48 coterminous with the peripheral edge 22 of the disc 20. The cover portion 40 is removably secured by screws 50 or other suitable means to the upstanding lips 42.

When the base 38 and cover 40 are in fitting engagement with each other, an interior blade chamber 52 is formed, in which the cutting blade 28 is completely enclosed when disposed in the retracted position. The blade chamber 52 also includes a slotted open end 48, (see FIGS. 2 and 6), through which the knife edge 32 passes and from which the knife edge 32 extends when the cutting blade 28 is moved from the retracted to the extended position.

As best shown in FIG. 11, the interior surface portions of the base 38 and cover 40 which form the interior chamber 52 are symmetrically contoured so that, when the base 38 and cover 40 are in fitting engagement with each other, two interconnected cavities 54 and 56 are formed, with a shoulder 58 formed at the intersection of the two cavities 54 and 56. The first cavity 54 slidably accommodates the knife edge 32 of the cutting blade 28 and is angularly inclined such that the knife edge 32 is maintained in an angularly disposed position relative to the path of rotation (see FIG. 6). When in the extended position, the angular position of the knife edge 32 creates air turbulence within the chassis 12 as the disc-shaped member 20 rotates, which turbulence assists the airborne discharge of grass, as will be described in greater detail herein. The second cavity 56 accommodates the remaining stem portion 30 of the cutting blade 28, including the collar 34 affixed thereon, and permits sliding movement of the blade stem 30 in the second cavity 56.

As it is desirable to be able to selectively control the disposition of the cutting blades 28, the lawn mower 10 includes control means 60 connected to the chassis 12 and movable axially along the axis of rotation of the disc-shaped member 20 for moving the cutting blades 28 between the retracted and the extended positions. While the control means 60 may be variously constructed, in the three embodiments illustrated, respectively, in FIGS. 3, 7 and 14, a sliding member 62 is movable axially along the axis of rotation between predetermined first and second axial positions, and first linkage means 64 operatively connects the sliding member 62 with the cutting blades 28 so that the cutting blades 28 are moved between their retracted and extended positions in response to movement of the sliding member 62 between its first and second axial positions.

Referring first to the embodiment shown in FIGS. 3 through 6, a drive shaft 66 is operatively connected with the prime mover 14 for rotation, which drive shaft 66 includes a tapered end portion 68 having an internally threaded bore 70. The disc-shaped member 20 has an axially centered hub 72 having a tapered center socket 74 in which the tapered end portion 68 of the drive shaft 66 fits. A threaded bolt 76 passes through a hole 78 in the base of the socket 74 and threadably engages the internally threaded bore 70 of the drive shaft 66, thereby securing the disc-shaped member 20 to the drive shaft 66 for common rotation.

The sliding member 62 includes a first cylindrical sleeve member 80 which encircles the drive shaft 66 near the tapered end portion 68. The first linkage means 64 includes a cam and pin follower assembly which transforms movement of the first sleeve member 80, which is essentially axially along the axis of rotation, into movement of the cutting blades 28, which is essentially perpendicular to the axis of rotation.

More particularly, the disc-shaped member 20 includes (see also FIG. 2) a circular pocket or depression 82 formed in the upper planar surface 24 and circumferentially surrounding the hub 72. The outer perimeter edge 84 of the pocket 82 is generally spaced inwardly of the upstanding lips 42, and a wall 86 thus separates the perimeter side edge 84 of the pocket 82 from the interior chambers 52 of the cutting blade housings 36. The wall 86 includes a bore 88 which is disposed generally transverse the axis of rotation and which has one open end 90 communicating with the perimeter side edge 84 of the pocket 82 and another open end 92 communicating with the second cavity 56 of the interior chamber 52 of each blade housing 36.

The cam and pin follower assembly 64 includes a progressively sloped cam surface 94 which is located for movement within the pocket 82 in response to movement of the first sleeve member 80, and a pin 96 which is located for movement within the bore 88 in response to following the progressively sloped cam surface 94. Displacement of the pin 96 moves the cutting blade 28 from its retracted position to its extended position.

The progressively sloped cam surface 94 is defined by a truncated cone-shaped member 98 which is carried circumferentially about the first sleeve member 80 for common axial movement. The cone 98 includes an outer perimeter surface which is progressively sloped between a first cam surface 100 having a first diameter, and a second cam surface 102 having a second diameter which is greater than the first diameter and thus extends a greater axial distance outwardly of the first sleeve member 80.

The pin 96 is slidably movable within the bore 88 and has an outer end 104 projecting outwardly of the open end 92 of the bore 88 and into the second cavity 56, thereby making abutting contact with the collar 34 on the end of the blade stem 30, and an inner end 106 projecting outwardly of the open end 90 of the bore 88 and into the pocket 82, thereby making abutting contact along the progressively sloped cam surface 94 of the cone 98.

Referring first to FIG. 3, when the first sleeve member 80 is disposed in the first axial position, the inner end 106 of the pin 96 extends substantially across the pocket 82 and makes abutting contact with the first cam surface 100. When the pin 96 is in this normal position, the cutting blade 28 is permitted to fully occupy the housing 36, and the cutting blade 28 is thus disposed in the retracted position. Referring now to FIG. 4, when the first sleeve member 80 is moved from its first to its second axial position, the cam surface 94 moves progressively into the pocket 82, and the inner end 106 of the pin 96 follows the progressively sloped surface 94 between the first cam surface 100 and the second cam surface 102. The pin 96 is thereby displaced out of its normal position, and its outer end 104 successively displaces the blade stem 30 in the second cavity 56, moving the knife edge 32 successively outwardly of the housing 36 until the cutting blade 28 is disposed in the fully extended position.

To permit the operator of the lawn mower 10 to selectively control the movement of the first sleeve member 80, and thus the disposition of the cutting blades 28 themselves, a control lever 108 is pivotally mounted on the handle 16 for displacement by the operator between an inoperative position in which the control lever 108 is spaced from the handle 16 (as shown in solid lines in FIG. 1) and an operative position, in which the control lever 108 is adjacent to the handle 16 (as shown in phantom lines in FIG. 1). Second linkage means 110 operatively connects the control lever 108 with the first sleeve member 80 so that movement of the control lever 108 axially moves the first sleeve member 80.

While various linkage arrangements are possible, in the illustrated embodiment, the second linkage means 110 is interconnected with three separate biasing means 112, 114, 116 so that the cutting blades 28 are normally maintained in the retracted position when the control lever 108 is in the inoperative position and are movable to the extended position by displacement of the control lever 108 to the operative position. Thus, in the absence of displacement of the control lever 108 by the operator, the cutting blades 28 are biased in the retracted position.

More particularly, first biasing means 112 biases the cutting blade 28 toward the retracted position when the first sleeve member 80 is in the first axial position, second biasing 114 means biases the first sleeve member 80 toward the first axial position when the control lever 108 is in the inoperative position, and third biasing means 116 biases the control lever 108 in the inoperative position.

In the illustrated embodiment, the first biasing means 112 includes a compressible, helical or coiled spring, hereafter referred to as the first biasing spring 118, which surrounds the cylindrical stem 30 of the cutting blade 28 between the collar 34 and the shoulder 58 formed at the intersection of the first and second cavities 54 and 56 of the blade housing 36. Movement of the cutting blade 28 toward the extended position in response to displacement of the pin 96 out of its normal position will compress the first biasing spring 118 between the collar 34 and the shoulder 58 and will thus be resisted (as is best shown in FIGS. 4 and 9). Likewise, movement of the cutting blade 28 toward the retracted position in response to displacement of the pin 96 toward the normal position will be urged by the expansion of the first biasing spring 118 between the collar 34 and the shoulder 58. The cutting blade 28 is thus biased toward the retracted position.

It should be appreciated that the cutting blade 28 can be biased toward the retracted position by other than the biasing spring 118. For example, the cam surface 94 may include a groove (not shown), and the inner end 106 of the pin 96 may be suitably engaged within the groove to follow along the progressively sloped cam surface 94.

The second biasing means 114, includes a second compressible, helical or coiled spring, hereafter referred to as the second biasing spring 120, which encircles the drive shaft 66 intermediate the hub 72 and an internal shoulder 122 defined in the first sleeve member 80. Movement of the first sleeve member 80 from the first axial position toward the second axial position will compress the second biasing spring 120 between the hub 72 and the shoulder 122 and will thus be resisted (as is best shown in FIGS. 4 and 8). Likewise, the return of the first sleeve member 80 to the first axial position will be urged by the expansion of the second biasing spring 120 between the hub 72 and the shoulder 122. The first sleeve member 80 is thus biased toward the first axial position.

The third biasing means 116 includes a third compressible spring, hereafter referred to as the third biasing spring 124, which is connected at one end to the control lever 108 and at the other end to the handle 16 and which is placed into tension when the control lever 108 is moved from the inoperative position to the operative position (see FIG. 1). Thus, return of the control lever 108 from the operative to the inoperative position is controlled by the third biasing spring 124.

As best shown in FIG. 2, the second linkage means 110 includes a thrust bearing 126 of conventional construction (see also FIGS. 3, 4, 7, and 8) surrounding the upper portion of the first sleeve member 80, a yoke 128 pivotally mounted at one end to the chassis 12 and making operative contact at the other end with the thrust bearing 126, and a control cable 111 operatively linking the control lever 108 with the yoke 128 so that movement of the control lever 108 pivotally moves the yoke 128. More particularly, when the control lever 108 is in the inoperative position, the second biasing spring 120 is permitted to bias the first sleeve member 80 in the first axial position, and the first biasing spring 118 maintains the cutting blade 28 in the retracted position. However, when the control lever 108 is subsequently moved to the operative position, the movement of the control cable 111 pivotally moves the yoke 128 and thereby transmits downward force through the thrust bearing 126 to the first sleeve member 80, causing axial displacement of the first sleeve member 80 to the second axial position against the action of the second biasing spring 120. This, in turn, displaces the pin 96 and moves the cutting blade 28 to its extended position against the action of the first biasing spring 118.

Release of the control lever 108 permits the third biasing spring 124 to return the control lever 108 to the inoperative position. The downward pressure formerly exerted upon the first sleeve member 80 by the yoke 128 ceases, and the second biasing spring 120 urges the first sleeve member 80 back to the first axial position, while the first biasing spring 118 urges the return of the cutting blade 28 back to the retracted position.

Figure 14:
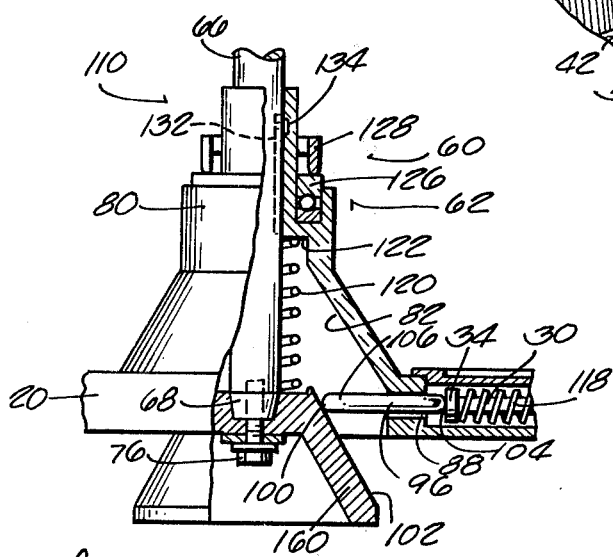
FIG. 14 is a fragmentary partially broken away side view of another embodiment of a blade control mechanism in which the cutting blades are shown in their retracted position.
Figure 15:
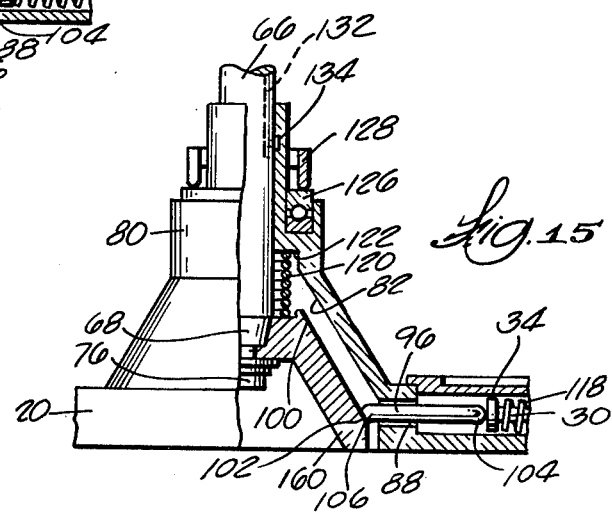
FIG. 15 is a fragmentary partially broken away side view of the blade control mechanism shown in FIG. 14, except that the cutting blades are shown in their extended position.

Reference is next made to the second alternate embodiment which is shown in FIGS. 14 and 15, and in which components which are common to the heretofore described embodiment (illustrated in FIGS. 3 through 6) are assigned common reference numerals. Unlike the first embodiment, the drive shaft 66 includes a groove 132 which is formed along the axis of rotation, and the first sleeve member 80 includes a key 134 which slidably engages the groove 132. By virtue of this construction, not only is the first sleeve member 80 axially movable along the drive shaft 66, as heretofore described, but the first sleeve member 80 also rotates in common with the drive shaft.

Also unlike the first embodiment, the disc-shaped member 20 is integrally connected with the first sleeve member 80 for common rotation about the drive shaft 66 as well as common axial movement along the drive shaft 66 between the first and second axial positions. As in the first embodiment, the biasing spring 120 maintains the first sleeve member 80, and thus the disc-shaped member 20, in the first axial position, and the control lever 108 is operative to move the first sleeve member 80 and the associated disc-shaped member 20 from the first axial position (shown in FIG. 14) to the second axial position (shown in FIG. 15).

As can best be seen in FIG. 14, the progressively sloped cam surface 94 is defined by a cone-shaped member 160 which extends below the tapered end portion 68 of the drive shaft 66 and which is secured by the bolt 76 to the drive shaft 66 for common rotation. As in the first described embodiment, the cone 160 includes an outer perimeter surface which is progressively sloped between the first cam surface 100 and the second cam surface 102 which extends a greater axial distance outwardly from the drive shaft 66 than the first cam surface 100. The disc-shaped member 20 includes an inverted circular pocket 82 which is formed in the lower planar surface 24. By virtue of this construction, movement of the first sleeve member 80 from its first axial position (shown in FIG. 14) to its second axial position (shown in FIG. 15) causes the disc-shaped member 20 to successively envelop the cone-shaped member 160 within its circular pocket 82 much in the same way the axially moving cone member 98 of the first embodiment (see FIGS. 3 and 4) successively occupies the circular pocket 82 of that embodiment.

Similar to the first embodiment, the pin 96 passes through the bore 88 to interconnect the collar 34 on the cutting blade 28 with the cam surface 94. Similarly, the spring 118 biases the cutting blade 28 in its retracted position. As can be seen in FIG. 14, when the first sleeve member 80 is in its first axial position, the pin 96 is in its heretofore described normal position and the inner end 106 of the pin 96 extends substantially across the pocket 82 and makes abutting contact with the first cam surface 100. The cutting blade 28 is thus disposed in its retracted position. Referring now to FIG. 15, when the first sleeve member 80 is moved from its first axial position to its second axial position, the cam surface 94 is progressively enveloped by the pocket 82 of the disc-shaped member 20, and the inner end 106 of the pin 96 follows the progressively sloped surface 94 between the first cam surface 100 and the second cam surface 102. The pin 96 is thus displaced out of its normal position against the action of spring 118 in the same fashion as heretofore described in the first embodiment, and the knife edge 32 is moved outwardly of the housing 36, the cutting blade 28 now being disposed in its fully extended position.

By virtue of this construction, the biasing spring 118 returns the cutting blade 28 from its extended position to its retracted position concurrently with movement of the disc-shaped member 20 from its second axial position, in which the disc-shaped member 20 is located generally adjacent to the ground, to its first axial position, in which the disc-shaped member 20 is raised upwardly into the chassis 12. However, should the biasing spring 118 fail to return the cutting blade 28 back to its normally retracted position during movement of the disc-shaped member 20 from its second axial position to its first axial position, the chance of inadvertent contact with the jammed and outwardly extended knife edge 32 is minimized since the disc-shaped member 20 is raised upwardly into the chassis and away from the ground.

Reference is next made to the third alternate embodiment which is shown in FIGS. 7 through 10, and in which components which are common to the heretofore described first and second embodiments are assigned common reference numerals. More particularly, as in the first described embodiment (FIGS. 3 through 5) the disc-shaped member 20 is secured by the bolt 76 to the drive shaft 66 for common rotation and includes the circular pocket 82 formed in the upper planar surface 22. As in the second described embodiment (FIGS. 14 and 15) the first sleeve member 80 includes the key 134 which slidably engages the groove 132 on the drive shaft 66, and the first sleeve member 80 is thus movable axially along as well as rotatable relative to the drive shaft 66. As in both the first and second embodiments, the pin 96 passes through the bore 88 to interconnect the collar 34 on the cutting blade 28 with the cam surface 94. Similarly, the control lever 108 is operative to axially move the first sleeve member 80 from the first axial position to the second axial position, and first, second and third biasing springs 118, 120 and 124 are operative so that the cutting blades 28 are normally maintained in their retracted positions.

However, unlike the heretofore described first and second embodiments, in which the progressively sloped cam surface 94 is disposed axially along the axis of rotation of the drive shaft 66, in the third alternate embodiment, the progressively sloped cam surface is mounted for rotation relative to the axis of rotation of the drive shaft 66 between two predetermined rotational positions in response to the axial movement of the first sleeve member 80.

More particularly, the first sleeve member 80 further includes an interior channel 136 or space formed intermediate the drive shaft 66 and the exterior surface of the first sleeve member 80. A second cylindrical sleeve member 138 has an upper end 140 movably enclosed in the interior channel 136 and a lower end 142 having an integral cam plate 144 and which is mounted in the pocket 82 on suitable bearings 146 and is thereby prevented from moving axially along the drive shaft 66. Like the cone-shaped cam surface 94 as heretofore described, the outer perimeters edge of the cam plate 144 is progressively sloped between a first cam surface 100 and a second cam surface 102 spaced axially outwardly of the first cam surface 100.

By virtue of this construction, the second sleeve member 138 and integral cam plate 144 are independently rotatable within the pocket 82 and relative to the drive shaft 66 between the first rotational position in which the first cam surface 100 contacts the inner end 106 of the pin 96, the cutting blades 28 being thus disposed in their retracted position (as shown in FIGS. 7 and 9), and a second rotational position in which the second cam surface 102 contacts the inner end 106 of the pin 96, the cutting blades 28 being thereby disposed in their extended position (as shown in FIG. 8).

In the second embodiment, means 148 is provided for rotating the second sleeve member 138 between its first and second rotational positions in response to axial movement of the first sleeve member 80 between its first and second axial positions. While the rotation means 148 may be variously constructed, in the illustrated embodiment, the upper end 140 of the second sleeve member 138 includes helical splines, or tongues 150, and the interior surface of the first sleeve member 80 includes corresponding helical grooves 152 engaging the tongues 150. It should be appreciated that the location of the tongues 150 and grooves 152 on the respective sleeve members 80 or 138 could be reversed and still achieve the same rotational effect.

In operation, when the control lever 108 is in the inoperative position, the first sleeve member 80 is biased by the second biasing spring 120 in its first axial position, the second sleeve member 138 is thereby disposed in its first rotational position, and the first biasing spring 118 biases the cutting blade 28 in the retracted position. In this position, the first and second sleeve members 80 and 138 together with the disc-shaped member 20 rotate in common with the drive shaft 66.

Subsequent movement of the control lever 108 toward the operative position will move the first sleeve member 80 toward the second axial position against the action of the second biasing spring 120. As the helical tongues 150 successively engage with the helical grooves 152, the second sleeve member 138, which is prevented from moving axially along the drive shaft 66, is rotatably shifted within the pocket 82 out of its first rotational position and toward its second rotational position. The rotatable shifting of the second sleeve member 138 from the first rotational position to the second rotational position will be independent of and in an opposite rotational direction to the rotating drive shaft 66.

When the control lever 108 reaches the operative position, the first sleeve member 80 is disposed in its second axial position and the second sleeve member 138 is thereby disposed in its second rotational position. The cutting blade 28 is now disposed in its extended position, and the second sleeve member 138 resumes common rotation with the drive shaft 66. Release of the control lever 108 permits the spring assisted return of the first sleeve member 80 to the first axial position, which will rotate the second sleeve member 138 back to its first rotational position and permit the spring assisted return of the cutting blades 28 to their retracted position following an operational sequence opposite to the one heretofore described.

Figure 12:
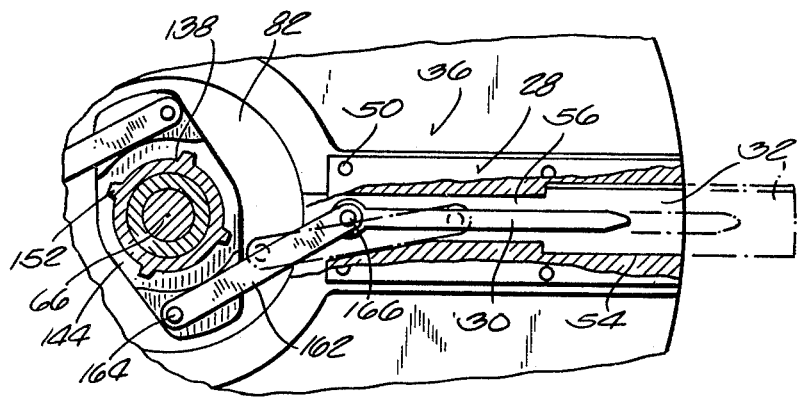
FIG. 12 is a fragmentary and partially broken away top view, similar to FIG. 9, of another embodiment of a blade control mechanism.
Figure 13:
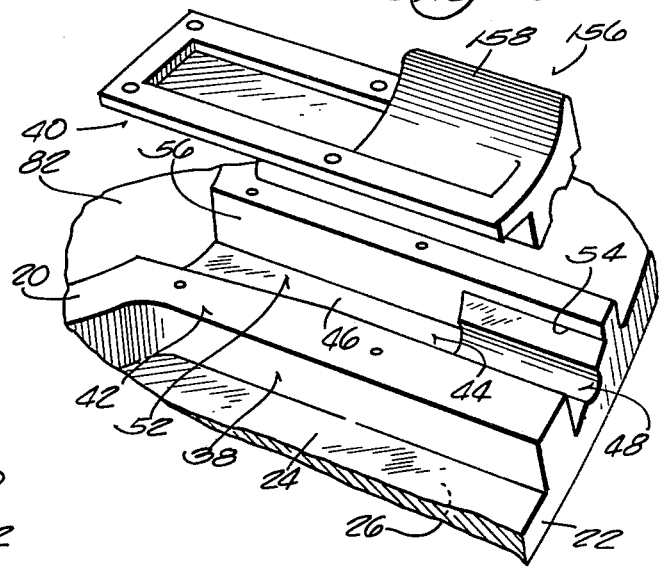
FIG. 13 is an exploded perspective view of the blade housing shown in FIG. 12.

FIGS. 12 and 13 illustrate an alternate method of operatively connecting the cutting blade 28 with the second cylindrical sleeve member 138 as has been heretofore described in the third alternate embodiment. As shown in FIG. 12, a connecting link 162 is pivotally connected at one end 164 to the cam plate 144 and is pivotally connected at opposite end 166 with the cutting blade stem 30. To accommodate passage of the connecting link 162, the wall 86 (see FIG. 11) is removed, and the second cavity 56 of the interior chamber 52 of each blade housing 36 communicates directly with the pocket 82.

By virtue of this construction, the cutting blade 28 is directly coupled to the second cylindrical sleeve member 138, and biasing spring 118 is not necessary to maintain the cutting blade 28 in its retracted position. Furthermore, it is not necessary that plate 144 have an outer perimeter surface which defines a progressively sloped cam surface. Instead, when the second cylindrical sleeve member 138 is in its first rotational position (as shown in solid lines in FIG. 12) the cutting blade 28 is maintained by the connecting link 162 in its retracted position, and when the second cylindrical sleeve member 138 is moved from its first rotational position to its second rotational position (as shown in phantom lines in FIG. 12) the cutting blade 28 is correspondingly moved by the connecting link 162 from its retracted position to its extended position.

As seen in FIG. 1, the lawn mower includes a discharge outlet 154 in the chassis 12 to permit grass cut by the extended cutting blades 28 to be discharged outwardly from within the chassis 12. As heretofore described, the knife edge 32 of each cutting blade 28 is angularly disposed by the housing 36 to create air turbulence within the chassis 12 to assist the airborne discharge of particles of cut grass through the discharge outlet 154. As shown in FIGS. 6 and 11, the lawn mower 10 includes vane means 156 carried by the disc-shaped member 20 for creating additional air turbulence when the disc-shaped member 20 is being rotated. This air turbulence further enhances the airborne discharge of cut grass particles, particularly when the cutting blades 28 are in their retracted position.

While the vane means 156 may be variously constructed, in the illustrated embodiment, a raised surface portion, generally concave in shape and defining an air scoop 158, is an integral part of the cover 40 for each housing 36. The air scoop 158 faces the direction of rotation and acts to lift air and thus create air turbulence during rotation of the disc-shaped member 20.

Various of the features of the invention are set forth in the following claims.

What is claimed is:

1. A rotary lawn mower comprising a chassis, a prime mover mounted on said chassis, a rotating member located within said chassis and having a peripheral edge, said rotating member being operatively connected with said prime mover for rotation thereby, a cutting blade carried by said rotating member and movable between a retracted position in which said cutting blade is positioned inwardly of said peripheral edge and an extended position in which said cutting blade extends outwardly beyond said peripheral edge, and control means connected to said chassis and movable axially of the axis of rotation of said rotating member for moving said cutting blade between said retracted and said extended positions independently of cutting blade rotation.

2. A lawn mower according to claim 1 wherein said control means includes a sliding member selectively movable axially along the axis of rotation of said rotating member between a first axial position and a second axial position.

3. A lawn mower according to claim 2 wherein said control means includes first linkage means connecting said sliding member with said cutting blade for moving said cutting blade between said retracted and said extended positions in response to movement of said sliding member between said first and said second axial positions.

4. A lawn mower according to claim 3 and further including means for biasing said cutting blade toward said retracted position when said sliding member is in said first axial position.

5. A lawn mower according to claim 3 and further including means for biasing said sliding member toward said first axial position.

6. A lawn mower according to claim 1 and further including a handle attached to said chassis, a control lever mounted on said handle and operative for displacement by the operator, and second linkage means operatively connected with said control lever for moving said control means axially of the axis of rotation of said rotating member in response to displacement of said control lever.

7. A lawn mower according to claim 6 wherein said control lever is pivotally attached to said handle for movement between an inoperative position spaced from said handle and an operative position adjacent to said handle, and wherein when said handle is in said inoperative position, said control means is disposed by said second linkage means such that said cutting blade is in said retracted position, and wherein, when said handle is in said operative position, said control means is disposed by said second linkage means such that said cutting blade is in said extended position.

8. A lawn mower according to claim 7 and further including means for biasing said control lever toward said inoperative position.

9. A lawn mower according to claim 3 and further including a drive shaft operatively connecting said rotating member with said prime mover, and wherein said sliding member includes a first cylindrical sleeve member operative for axial movement upon said drive shaft between said first and said second axial positions.

10. A lawn mower according to claim 9 wherein said first linkage means includes pin means movable between a normal position and a displaced position and operative for moving said cutting blade between said retracted and said extended positions in response to movement of said pin means between said normal and said displaced positions, and cam means operatively connecting said first cylindrical sleeve member with said pin means for moving said pin means between said normal and said displaced positions in response to movement of said first cylindrical sleeve member between said first and said second axial positions.

11. A lawn mower according to claim 10 wherein said cam means includes a cone-shaped member carried circumferentially about said first cylindrical sleeve member for common movement therewith, said cone-shaped member having an outer perimeter surface progressively sloped between a first cam surface in contact with said pin means when said first cylindrical sleeve member is located in said first axial position and a second cam surface spaced axially outwardly of said first cam surface and in contact with said pin means when said first cylindrical sleeve member is located in said second axial position, and wherein said pin means is disposed in said normal position when in contact with said first cam surface and is disposed in said displaced position when in contact with said second cam surface.

12. A lawn mower according to claim 10 and further including key means operatively connecting said first cylindrical sleeve member with said drive shaft for common rotation therewith while permitting axial movement of said first cylindrical sleeve member between said first and said second axial positions, and further including means operatively connecting said rotating member with said first cylindrical sleeve member for common rotation about said drive shaft and for common axial movement between said first axial position and said second axial position, wherein said cam means includes a cone-shaped member mounted on said drive shaft for common rotation therewith, said cone-shaped member having an outer perimeter surface progressively sloped between a first cam surface in contact with said pin means when said first cylindrical sleeve member, and thus said rotating member, is located in said first axial position and a second cam surface spaced axially outwardly of said first cam surface and in contact with said pin means when said first cylindrical sleeve member, and thus said rotating member, is located in said second axial position, and wherein said pin means is disposed in said normal position when in contact with said first cam surface and is disposed in said displaced position when in contact with said second cam surface.

13. A lawn mower according to claim 9 and further including key means operatively connecting said first cylindrical sleeve member with said drive shaft for common rotation therewith while permitting axial movement of said first cylindrical sleeve member between said first and said second axial positions, and wherein said first linkage means includes a second cylindrical sleeve member, bearing means for independently rotatably mounting said second cylindrical sleeve member intermediate said drive shaft and said first cylindrical sleeve member, rotation means for rotating said second cylindrical sleeve member relative to said drive shaft between a first rotational position and a second rotational position in response to movement of said first cylindrical sleeve member between said first axial position and said second axial position, and means operatively connecting said cutting blade with said second cylindrical sleeve member for disposing said cutting blade in said retracted position when said second cylindrical sleeve member is located in said first rotational position and for disposing said cutting blade in said extended position when said second cylindrical sleeve member is located in said second rotational position.

14. A lawn mower according to claim 13 wherein said means for operatively connecting said cutting blade with said second cylindrical sleeve member includes pin means movable between a normal position and a displaced position and operative for moving said cutting blade between said retracted position and said extended position in response to movement of said pin means between said normal and said displaced positions, and cam means operatively connecting said second cylindrical sleeve member with said pin means for moving said pin means between said normal and said displaced positions in response to movement of said second cylindrical sleeve member between said first rotational position and said second rotational position.

15. A lawn mower according to claim 14 wherein said cam means includes a cam plate attached to said second cylindrical sleeve member for common rotation therewith, said cam plate having an outer peripheral edge progressively sloped between a first cam surface in contact with said pin means when said second cylindrical sleeve member is in said first rotational position and a second cam surface spaced axially outwardly of said first cam surface and in contact with said pin means when said second cylindrical sleeve member is in said second rotational position, and wherein said pin means is disposed in said normal position when in contact with said first cam surface and is disposed in said displaced position when in contact with said second cam surface.

16. A lawn mower according to claim 13 wherein said means for operatively connecting said cutting blade with said second cylindrical sleeve member includes a plate member attached to said second cylindrical sleeve member for common rotation therewith, and a link member having opposite ends, one of said opposite ends being attached to said plate member, the other one of said opposite ends being attached to said cutting blade.

17. A lawn mower according to claim 13 wherein said rotation means includes a helical groove on one of said first and second cylindrical sleeve members, and a helical tongue on the other of said first and second cylindrical sleeve members and engaging said helical groove.

18. A lawn mower according to claim 1 and further including a plurality of cutting blades carried by said cutting blade housing, each of said cutting blades being movable between said retracted and extended positions, and wherein said control means is operative for simultaneously moving said plurality of cutting blades between said retracted and extended positions in response to movement of said control means between said first and second axial positions.

19. A rotary lawn mower comprising a chassis, a prime mover mounted on said chassis, a rotating member including a cutting blade housing having a peripheral edge, located within said chassis and operatively connected with said prime mover for rotation thereby, a cutting blade for cutting grass in response to rotation thereof, means mounting said cutter blade on said cutting blade housing for movement between a retracted position in which said cutting blade is positioned inwardly of said peripheral edge and an extended position in which said cutting blade extends outwardly beyond said peripheral edge, a discharge outlet in said chassis permitting the discharge of grass cut by said cutting blade, and vane means independent of said cutting blade and carried by said rotating member for creating air turbulence when said rotating member is being rotated to assist the discharge of grass through said discharge outlet, and control means connected to said chassis and movable axially of the axis of rotation of said rotating member for moving said cutting blade between said retracted and extended positions.

20. A lawn mower according to claim 19 wherein said cutting blade housing includes a chamber having an open end portion disposed along said peripheral edge, an access opening permitting access into said chamber, and a cover member covering said access opening to thereby prevent access into said chamber, wherein said cutting blade includes a stem portion having opposite ends, a knife edge integral with one of said opposite ends, wherein said stem portion and said knife edge are enclosed by said chamber when said cutting blade is in said retracted position, and wherein said knife edge is movable through said open end portion to extend outwardly beyond said peripheral edge when said cutting blade is moved from said retracted position to said extended position, and wherein said vane means is an integral part of said cover member.

21. A rotary lawn mower comprising a chassis, a handle attached to said chassis, a prime mover mounted on said chassis, a drive shaft operatively connected with said prime mover for rotation, a rotating member located within said chassis and operatively connected with said drive shaft, said rotating member having a peripheral edge, at least one cutting blade carried by said rotating member and movable between a retracted position in which said cutting blade is positioned inwardly of said peripheral edge and an extended position in which said cutting blade extends outwardly beyond said peripheral edge, first biasing means for biasing said cutting blade toward said retracted position, a first cylindrical sleeve member enclosing a portion of said drive shaft and movable upon said drive shaft between a first axial position and a second axial position, second biasing means for biasing said first cylindrical sleeve member toward said first axial position, a control lever mounted on said handle and operative for displacement by the operator between an inoperative position spaced from said handle and an operative position adjacent to said handle, third biasing means for biasing said control lever toward said inoperative position, linkage means operatively connecting said first cylindrical sleeve member with said control lever for moving said first cylindrical sleeve member from said first axial position to said second axial position against the action of said second biasing means in response to displacement of said control lever from said inoperative position to said operative position, pin means movable between a normal position and a displaced position and operative for moving said cutting blade from said retracted position to said extended position against the action of said first biasing means in response to movement of said pin means from said normal position to said displaced position, a cone-shaped member carried circumferentially about said first cylindrical sleeve member for common axial movement therewith, said cone-shaped member having an outer perimeter surface progressively sloped between a first cam surface in contact with said pin means when said first cylindrical sleeve member is located by said second biasing means in said first axial position and a second cam surface spaced axially outwardly of said first cam surface and in contact with said pin means when said first cylindrical sleeve member is located by said linkage means in said second axial position, said pin means being disposed in said normal position when in contact with said first cam surface and being moved from said normal to said displaced position in response to following said outer perimeter surface between said first and said second cam surfaces.

22. A rotary lawn mower according to claim 21 and further including a discharge outlet in said chassis permitting the discharge of grass cut by said cutting blades, and an air deflection vane mounted on said rotating member and having a generally concave raised surface portion facing the direction of rotation of said rotating member.

23. A rotary lawn mower according to claim 22 wherein said rotating member includes a cutting blade housing having a chamber including an open end portion disposed along said peripheral edge, an access opening permitting access into said chamber, a cover member covering said access opening, wherein said cutting blade includes a stem portion having opposite ends, a knife edge integral with one of said opposite ends, wherein said stem portion and said knife edge are enclosed by said chamber when said cutting blade is in said retracted position, wherein said knife edge is movable through said open end portion to extend outwardly beyond said peripheral edge when said cutting blade is moved from said retracted position to said extended position, and wherein said air deflection vane is an integral part of said cover member.

24. A rotary lawn mower comprising a chassis, a handle attached to said chassis, a prime mover mounted on said chassis, a drive shaft operatively connected with said prime mover for rotation, a rotating member located within said chassis and having a peripheral edge, key means for operatively connecting said rotating member with said drive shaft for common rotation therewith while permitting axial movement of said rotating member between a first axial position and a second axial position on said drive shaft, at least one cutting blade carried by said rotating member and movable between a retracted position in which said cutting blade is positioned inwardly of said peripheral edge and an extended position in which said cutting blade extends outwardly beyond said peripheral edge, first biasing means for biasing said cutting blade toward said retracted position, second biasing means for biasing said rotating member toward said first axial position, a control lever mounted on said handle and operative for displacement by the operator between an inoperative position spaced from said handle and an operative position adjacent to said handle, third biasing means for biasing said control lever toward said inoperative position, linkage means operatively connecting said rotating member with said control lever for moving said rotating member from said first axial position to said second axial position against the action of said second biasing means in response to displacement of said control lever from said inoperative position to said operative position, pin means movable between a normal position and a displaced position and operative for moving said cutting blade from said retracted position to said extended position against the action of said first biasing means in response to movement of said pin means from said normal position to said displaced position, a cone-shaped member mounted on said drive shaft for common rotation therewith, said cone-shaped member having an outer perimeter surface progressively sloped between a first cam surface in contact with said pin means when said rotating member is located by said second biasing means in said first axial position and a second cam surface spaced axially outwardly of said first cam surface and in contact with said pin means when said rotating member is located by said linkage means in said second axial position, said pin means being disposed in said normal position when in contact with said first cam surface and being moved from said normal to said displaced position in response to following said outer perimeter surface between said first and said second cam surfaces.

25. A rotary lawn mower according to claim 24 and further including a discharge outlet in said chassis permitting the discharge of grass cut by said cutting blades, and an air deflection vane mounted on said rotating member and having a generally concave raised surface portion facing the direction of rotation of said rotating member.

26. A rotary lawn mower according to claim 25 wherein said rotating member includes a cutting blade housing having a chamber including an open end portion disposed along said peripheral edge, an access opening permitting access into said chamber, a cover member covering said access opening, wherein said cutting blade includes a stem portion having opposite ends, a knife edge integral with one of said opposite ends, wherein said stem portion and said knife edge are enclosed by said chamber when said cutting blade in is said retracted position, wherein said knife edge is movable through said open end portion to extend outwardly beyond said peripheral edge when said cutting blade is moved from said retracted position to said extended position, and wherein said air deflection vane is an integral part of said cover member.

27. A rotary lawn mower comprising a chassis, a handle attached to said chassis, a prime mover mounted on said chassis, a drive shaft operatively connected with said prime mover for rotation, a rotating member located within said chassis and operatively connected with said drive shaft, said rotating member having a peripheral edge, at least one cutting blade carried by said rotating member and movable between a retracted position in which said cutting blade is positioned inwardly of said peripheral edge and an extended position in which said cutting blade extends outwardly beyond said peripheral edge, a first cylindrical sleeve member enclosing a portion of said drive shaft, key means for operatively connecting said first cylindrical sleeve member with said drive shaft for common rotation therewith while permitting axial movement of said first cylindrical sleeve member between a first axial position and a second axial position on said drive shaft, sleeve biasing means for biasing said first cylindrical sleeve member toward said first axial position, a control lever mounted on said handle and operative for displacement by the operator between an inoperative position spaced from said handle and an operative position adjacent to said handle, lever biasing means for biasing said control lever toward said inoperative position, linkage means operatively connecting said first cylindrical sleeve member with said control lever for moving said first cylindrical sleeve member from said first axial position to said second axial position against the action of said sleeve biasing means in response to displacement of said control lever from said inoperative position to said operative position, a second cylindrical sleeve member, bearing means for independently rotatably mounting said second cylindrical sleeve member intermediate said drive shaft and said first cylindrical sleeve member, rotation means for rotating said second cylindrical sleeve member relative to said drive shaft between first and second rotationally spaced positions in response to movement of said first cylindrical sleeve member by said linkage means between said first and said second axial positions, and means operatively connecting said cutting blade with said second cylindrical sleeve member for disposing said cutting blade in said retracted position when said second cylindrical sleeve member is in said first rotational position and for disposing said cutting blade in said extended position when said second cylindrical sleeve member is in said second rotational position.

28. A rotary lawn mower according to claim 27 wherein said rotation means includes a helical groove on one of said first and second cylindrical sleeve members, and a helical tongue on the other of said first and second cylindrical sleeve members and engaging said helical groove.

29. A rotary lawn mower according to claim 28 wherein said means for operatively connecting said cutting blade with said second cylindrical sleeve member includes a plate member attached to said second cylindrical sleeve member for common rotation therewith, and a link member having opposite ends, one of said opposite ends being attached to said plate member, the other one of said opposite ends being attached to said cutting blade.

30. A rotary lawn mower according to claim 28 and further including means for biasing said cutting blade toward said retracted position, and wherein said means for operatively connecting said cutting blade with said second cylindrical sleeve member includes pin means movable between a normal position and a displaced position and operative for moving said cutting blade from said retracted position to said extended position against the action of said cutting blade biasing means in response to movement of said pin means from said normal position to said displaced position, and a cam plate attached to said second cylindrical sleeve member for common rotation therewith, said cam plate having an outer peripheral edge progressively sloped between a first cam surface in contact with said pin means when said second cylindrical sleeve member is in said first rotational position and a second cam surface spaced axially outwardly of said first cam surface and in contact with said pin means when said second cylindrical sleeve member is in said second rotational position, said pin means being disposed in said normal position when in contact with said first cam surface and being moved from said normal to said displaced position in response to following said outer peripheral edge between said first and said second cam surfaces.

31. A rotary lawn mower according to claim 29 or 30 and further including a discharge outlet in said chassis permitting the discharge of grass cut by said cutting blades, and an air deflection vane mounted on said rotating member and having a generally concave raised surface portion facing the direction of rotation of said rotating member.

32. A rotary lawn mower according to claim 31 wherein said rotating member includes a cutting blade housing having a chamber including an open end portion disposed along said peripheral edge, an access opening permitting access into said chamber, a cover member covering said access opening, wherein said cutting blade includes a stem portion having opposite ends, a knife edge integral with one of said opposite ends, wherein said stem portion and said knife edge are enclosed by said chamber when said cutting blade is in said retracted position, wherein said knife edge is movable through said open end portion to extend outwardly beyond said peripheral edge when said cutting blade is moved from said retracted position to said extended position, and wherein said air deflection vane is an integral part of said cover member.

* * * * *